(12) United States Patent
Sakai et al.

(10) Patent No.: US 11,353,546 B2
(45) Date of Patent: Jun. 7, 2022

(54) RADAR APPARATUS

(71) Applicant: DENSO CORPORATION, Kariya (JP)

(72) Inventors: Toshiya Sakai, Nisshin (JP);
Kazumasa Sakurai, Nisshin (JP);
Kazushi Kawaguchi, Nisshin (JP);
Takuya Koya, Kariya (JP)

(73) Assignee: DENSO CORPORATION, Kariya (JP)

( * ) Notice: Subject to any disclaimer, the term of this patent is extended or adjusted under 35 U.S.C. 154(b) by 374 days.

(21) Appl. No.: 16/303,935

(22) PCT Filed: May 17, 2017

(86) PCT No.: PCT/JP2017/018558
§ 371 (c)(1),
(2) Date: Nov. 21, 2018

(87) PCT Pub. No.: WO2017/204059
PCT Pub. Date: Nov. 30, 2017

(65) Prior Publication Data
US 2019/0302226 A1 Oct. 3, 2019

(30) Foreign Application Priority Data
May 23, 2016 (JP) .............................. JP2016-102582

(51) Int. Cl.
*G01S 7/03* (2006.01)
*H01Q 1/42* (2006.01)
(Continued)

(52) U.S. Cl.
CPC ........... *G01S 7/032* (2013.01); *H01Q 1/3233* (2013.01); *H01Q 1/42* (2013.01); *H01Q 15/08* (2013.01);
(Continued)

(58) Field of Classification Search
CPC .... G01S 7/032; G01S 13/93; G01S 2007/027;
G01S 2013/93271; G01S 2013/93275;
(Continued)

(56) References Cited

U.S. PATENT DOCUMENTS 6,489,927 B2 * 12/2002 LeBlanc ............... G01S 13/346
343/713
6,496,138 B1 * 12/2002 Honma .................... H01Q 1/42
342/70
(Continued)

FOREIGN PATENT DOCUMENTS

JP 2015-137877 7/2015

OTHER PUBLICATIONS

Rohde & Schwarz ("Fundamentals of Radome and Bumper Measurements Using the R&S® QAR"). Mar. 2000. Accessed Jan. 2, 2021 :<https://scdn.rohdeschwarz.com/ur/pws/dl_downloads/premiumdownloads/premium_dl_brochures_and_datasheets/premium_dl_whitepaper/Fundamentals-of_radome-and-bumper-measurements_wp_en_3608> (Year: 2020).*

*Primary Examiner* — Matthew M Barker
(74) *Attorney, Agent, or Firm* — Maschoff Brennan (57) ABSTRACT

A radar apparatus includes an antenna unit and a cover unit. The cover unit is arranged at a position through which an electromagnetic wave sent and received by the antenna unit passes. The cover unit has, in an order from closer to the antenna unit, a first dielectric layer formed of a dielectric and a second dielectric layer formed of a dielectric having a dielectric constant different from that of the first dielectric layer. The first dielectric layer is configured to have a thickness not more than that for a maximum external transmittance. The external transmittance indicates a transmittance of an electromagnetic wave, which is emitted in a direction of an incidence angle with respect to the first
(Continued)

dielectric layer, which is equal to a maximum sensing angle, when the electromagnetic wave is transmitted through the cover unit.

8 Claims, 7 Drawing Sheets

(51) Int. Cl.
    *G01S 13/931* (2020.01)
    *H01Q 1/32* (2006.01)
    *B60R 19/48* (2006.01)
    *H01Q 15/08* (2006.01)
    *G01S 7/02* (2006.01)

(52) U.S. Cl.
    CPC ............. *B60R 19/483* (2013.01); *G01S 7/027* (2021.05); *G01S 13/931* (2013.01); *G01S 2013/93271* (2020.01); *G01S 2013/93275* (2020.01)

(58) Field of Classification Search
    CPC ...... B60R 19/03; B60R 19/483; H01Q 15/08; H01Q 1/3233; H01Q 1/42
    See application file for complete search history.

(56) References Cited

U.S. PATENT DOCUMENTS

| | | | |
|---|---|---|---|
| 7,023,331 B2* | 4/2006 | Kodama | G01S 7/4008 |
| | | | 340/435 |
| 8,111,206 B2* | 2/2012 | Lee | H01Q 1/424 |
| | | | 343/872 |
| 9,812,787 B2* | 11/2017 | Binzer | G01S 13/931 |
| 10,048,369 B2* | 8/2018 | Aoki | H01Q 15/0013 |
| 2004/0246195 A1* | 12/2004 | Usami | H01Q 1/424 |
| | | | 343/872 |
| 2010/0097264 A1 | 4/2010 | Kawasaki et al. | |
| 2014/0091969 A1 | 4/2014 | Shi et al. | |
| 2018/0159207 A1* | 6/2018 | Shurish | H01Q 1/422 |

* cited by examiner

RADAR APPARATUS

CROSS-REFERENCE TO RELATED APPLICATION

The present application is a national stage application under 35 U.S.C. § 371(c) of PCT Application No. PCT/JP2017/018558, filed on May 17, 2017, which is based on and claims the benefit of priority from earlier Japanese Patent Application No. 2016-102582 filed in Japan Patent Office on May 23, 2016, the entire description of which is incorporated herein by reference.

TECHNICAL FIELD

The present disclosure relates to a technique for detecting an object by sending and receiving electromagnetic waves.

BACKGROUND ART

PTL 1 below discloses a radar apparatus mounted to a vehicle. This radar apparatus is used by being attached inside a cover member, such as a bumper of the vehicle.

CITATION LIST

Patent Literature

[PTL 1] JP 2010-101643 A

SUMMARY OF THE INVENTION

However, as a result of detailed investigations by the inventor, in the radar apparatus described in PTL 1, a problem is found that radar waves applied from the radar apparatus are reflected by a bumper, thereby reducing radar waves transmitted through the bumper and reducing the sensing performance.

One aspect of the present disclosure is desirably capable of suppressing a decrease in sensing performance in a radar apparatus.

One aspect of the present disclosure is a radar apparatus including an antenna unit and a cover unit. The radar apparatus detects a distance to an object present in an angular range representing a range of angles determined in advance by sending and receiving an electromagnetic wave.

The antenna unit is configured so as to send and receive the electromagnetic wave. The cover unit is arranged at a position through which the electromagnetic wave sent and received by the antenna unit passes.

The cover unit has, in an order from closer to the antenna unit, a first dielectric layer formed of a dielectric and a second dielectric layer formed of a dielectric having a dielectric constant different from that of the first dielectric layer.

The first dielectric layer is configured to have a thickness not more than that for a maximum external transmittance indicating a transmittance of an electromagnetic wave, which is emitted in a direction of an incidence angle with respect to the first dielectric layer, which is equal to a maximum sensing angle, when the electromagnetic wave is transmitted through the cover unit.

Such a configuration suppresses a decrease in the transmittance of at least an electromagnetic wave emitted in a direction of the maximum sensing angle. As a result, a decrease in the transmittance is suppressed when an electromagnetic wave, which is emitted to the entire angular range, is transmitted through the cover unit.

The decrease in sensing performance of the radar apparatus is thus allowed to be suppressed.

The reference signs in parentheses written in this section and the claims indicate correspondence with specific means described in embodiments below as one mode and do not limit the technical scope of the present disclosure.

DESCRIPTION OF EMBODIMENTS

Embodiments of the present disclosure are described with reference to the drawings.

1. First Embodiment

[1-1. Configuration]

Figure 1:
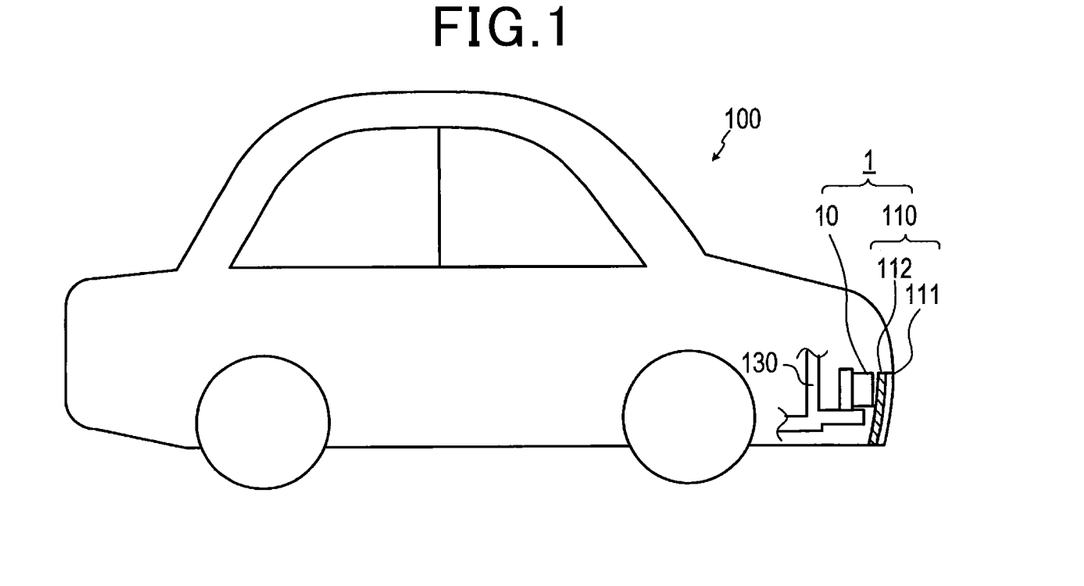
FIG. 1 is a diagram illustrating a configuration of a radar apparatus.

A radar apparatus 1 illustrated in FIG. 1 is an apparatus mounted to a vehicle. The radar apparatus 1 detects a distance to an object present in a sensing range by sending and receiving electromagnetic waves at a frequency determined in advance (hereinafter, a probing wave). The object herein means a tangible object. The tangible object may include, for example, a vehicle, a person, a building, and the like. The sensing range means an angular range determined in advance and a range that allows the radar apparatus 1 to sense an object, such as an obstacle.

In the present embodiment, a description is given with a range of angles determined in advance in a horizontal direction as the sensing range. A transverse direction mentioned below is equivalent to a horizontal direction. It should be noted that the sensing range is not limited to this. For example, the sensing range may include a range of angles determined in advance in an arbitrary direction, such as a vertical direction.

The radar apparatus 1 is provided with an apparatus portion 10 and a bumper 110. The bumper 110 corresponds to a cover unit. The bumper 110 is arranged on a front face of a vehicle 100. The apparatus portion 10 is arranged inside the bumper 110 and is fixed to a fixing member 130 configured as part of a frame of the vehicle 100. Herein, inside means a side of the center of gravity of the vehicle 100.

Figure 2:
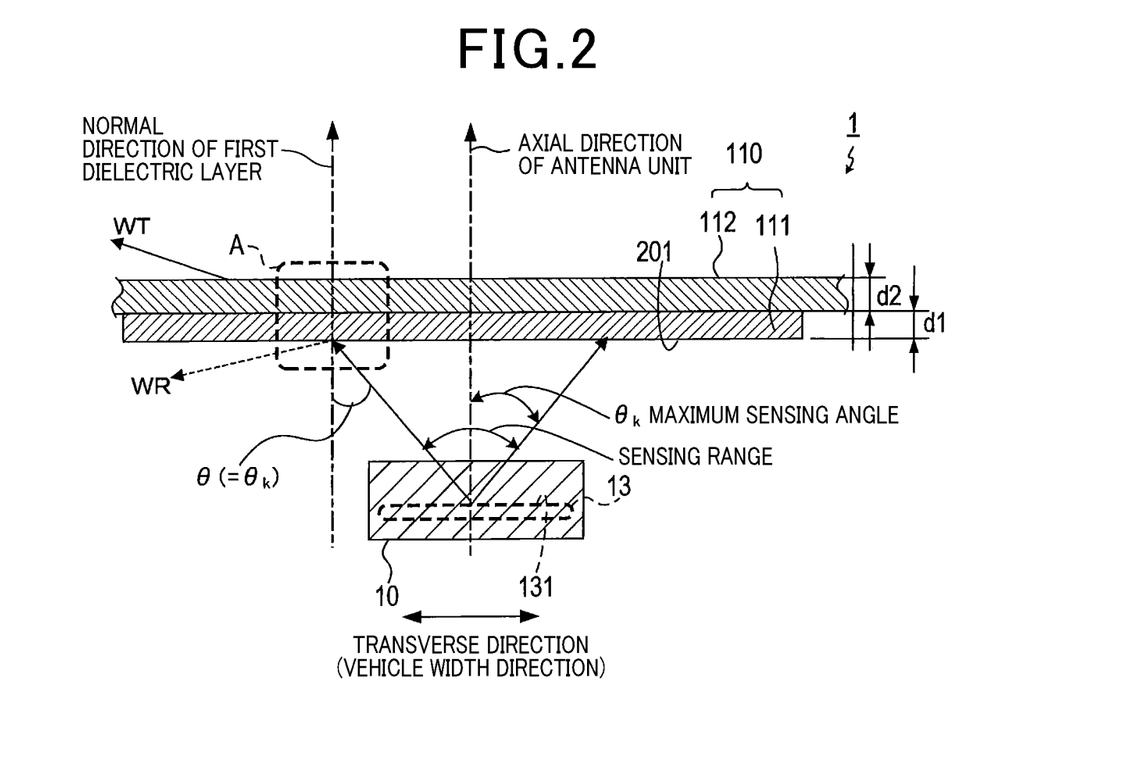
FIG. 2 is a diagram illustrating a relationship between an apparatus portion and a bumper.

In other words, as illustrated in FIG. 2, the radar apparatus 1 is configured to send a probing wave sent from the apparatus portion 10 to the outside of the vehicle 100 via the bumper 110. The radar apparatus 1 is configured to receive a probing wave reflected by an object present in the sensing range of the radar apparatus 1 in the outside of the vehicle 100.

Figure 3:
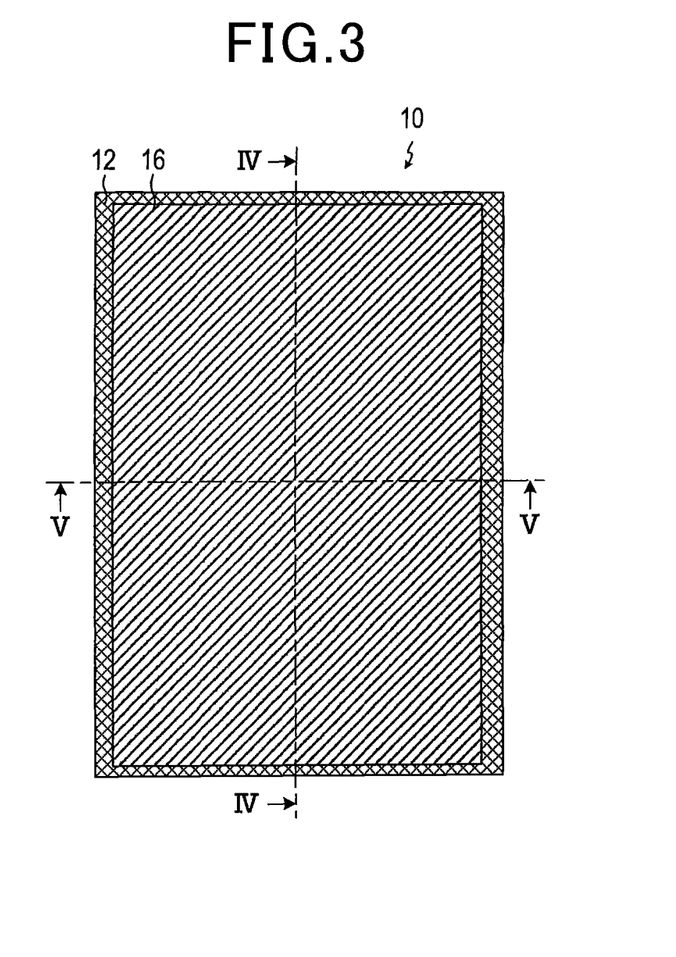
FIG. 3 is a top view of the apparatus portion.
Figure 4:
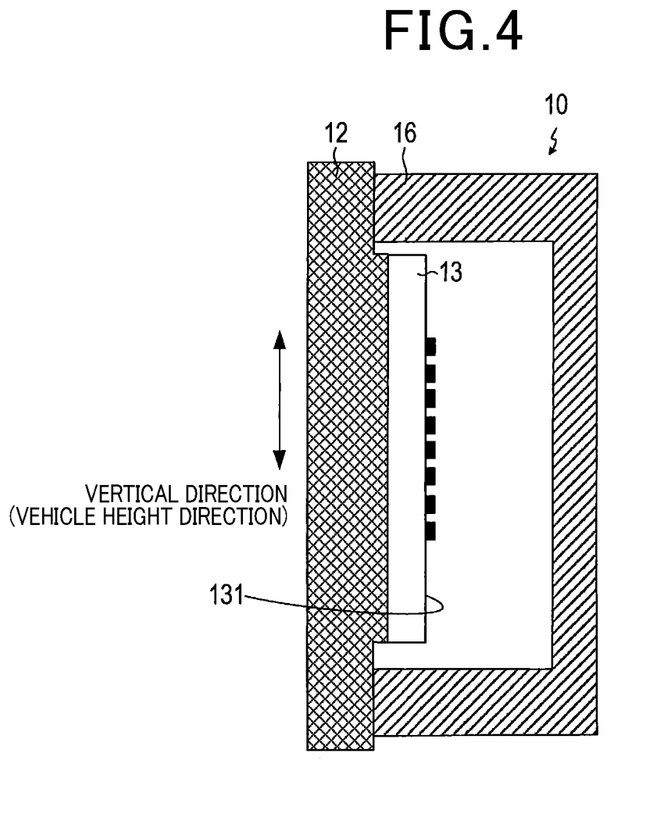
FIG. 4 is a cross-sectional view taken across a line IV-IV shown in FIG. 3.
Figure 5:
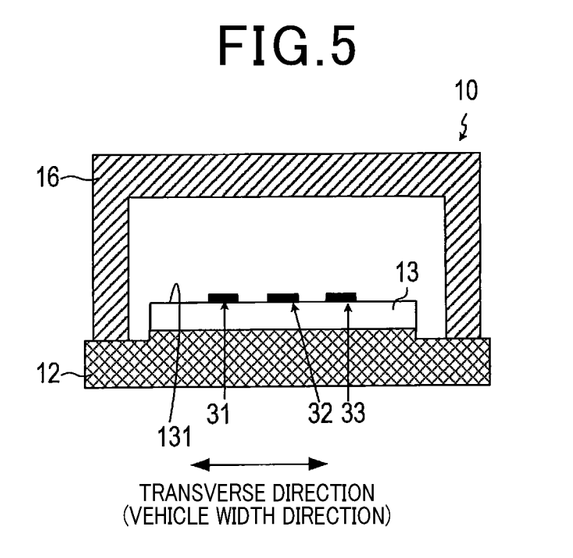
FIG. 5 is a cross-sectional view taken across a line V-V shown in FIG. 3.

As illustrated in FIGS. 3 to 5, the apparatus portion 10 is provided with a radar body 12, an antenna unit 13, and a radome 16.

In the radar body 12, a sending and receiving circuit, a signal processing unit, and the like are included. The sending and receiving circuit sends and receives a probing wave via the antenna unit 13. The signal processing unit processes the received signal obtained by the sending and receiving circuit to calculate information on the object having reflected the probing wave.

The antenna unit 13 sends and receives the probing wave. Specifically, as illustrated in FIGS. 4 and 5, the antenna unit 13 has a shape in which a plurality of array antennas are aligned in a transverse direction, each array antenna formed of a plurality of antenna elements aligned vertically in a row. In the present embodiment, eight antenna elements are aligned in the vertical direction and three antenna elements are aligned in the transverse direction.

The vertical direction is a direction in agreement with a vehicle height direction when the radar apparatus 1 is fixed to the vehicle 100. The transverse direction is a direction in agreement with a vehicle width direction when the radar apparatus 1 is fixed to the vehicle 100. Any one of a plurality of array antennas 31 to 33 is used as a sending antenna, and the remaining two among the plurality of array antennas 31 to 33 are used as receiving antennas.

It should be noted that the configuration is not limited to this and all of the plurality of array antennas 31 to 33 may be used as sending antennas. As another example, all of the plurality of array antennas 31 to 33 may be used as receiving antennas. In the plurality of array antennas 31 to 33, the number of array antennas used as a sending antenna, the number of array antennas used as a receiving antenna, and the arrangement of the sending antenna(s) and the receiving antenna(s) may be set arbitrarily.

The radome 16 is formed of a dielectric. The radome 16 is formed in a box shape with one open surface covering the antenna unit 13. The radome 16 is subjected to various contrivances to suppress influence to a minimum due to reflection of the probing wave at the boundary surface. However, since they are already known, a detailed description of them is omitted.

The bumper 110 is, as described above, arranged at a position through which a probing wave sent and received by the antenna unit 13 passes. As illustrated in FIG. 2, the bumper 110 has, in an order from closer to the antenna unit 13, a first dielectric layer 111 and a second dielectric layer 112. The first dielectric layer 111 is formed of a dielectric, and the second dielectric layer 112 is formed of a dielectric having a dielectric constant different from that of the first dielectric layer.

In the present embodiment, the second dielectric layer 112 corresponds to a bumper body made of resin. The first dielectric layer 111 is made of fluororesin and is laminated on the second dielectric layer 112 with a uniform thickness. It should be noted that the configurations of the first dielectric layer 111 and the second dielectric layer 112 are not limited to these.

In the present embodiment, the first dielectric layer 111 is configured to have a thickness not more than that for a maximum external transmittance. The external transmittance indicates a transmittance of a probing wave, which is emitted in a direction of an incidence angle θ to the first dielectric layer 111, which is equal to a maximum sensing angle θk, when the probing wave is transmitted through the bumper 110.

The maximum sensing angle θk represents an angle for a maximum incidence angle to the first dielectric layer 111 in the sensing range. The maximum sensing angle θk is an angle to an axial direction of the antenna unit 13 and is used to represent the size of the sensing range. The probing wave emitted in the direction of the maximum sensing angle θk is equal to a probing wave emitted to the outermost area in the sensing range.

The incidence angle herein means an angle between an electromagnetic wave entering an object and a normal direction of the object. The antenna unit 13 and the bumper 110 are arranged to be parallel. In other words, a sending and receiving surface 131 representing a surface, from which a probing wave is sent and by which the probing wave is received, in the antenna unit 13 and a surface 201, which faces the antenna unit 13, of the first dielectric layer 111 are arranged parallel. Accordingly, in the present embodiment, the normal direction of the first dielectric layer 111 shows the same direction as the axial direction of the antenna unit 13.

Specifically, the probing wave is set at a frequency of 24 GHz and the sensing range is set in a range of 80 deg with respect to the axial direction of the antenna unit 13. In other words, the maximum sensing angle θk is set at 80 deg. The second dielectric layer 112 is formed to have a relative dielectric constant εr2 of 2.5 and to have a thickness d2 of 2.8 mm. The first dielectric layer 111 is formed to have a relative dielectric constant εr1 of 2.0 and to have a thickness d1 of 2.8 mm or less that indicates a thickness for a maximum external transmittance in the configuration of the present embodiment. Specifically, the first dielectric layer 111 is formed to have the thickness d1 of 2.7 mm.

[1-2. Action]

Figure 6:
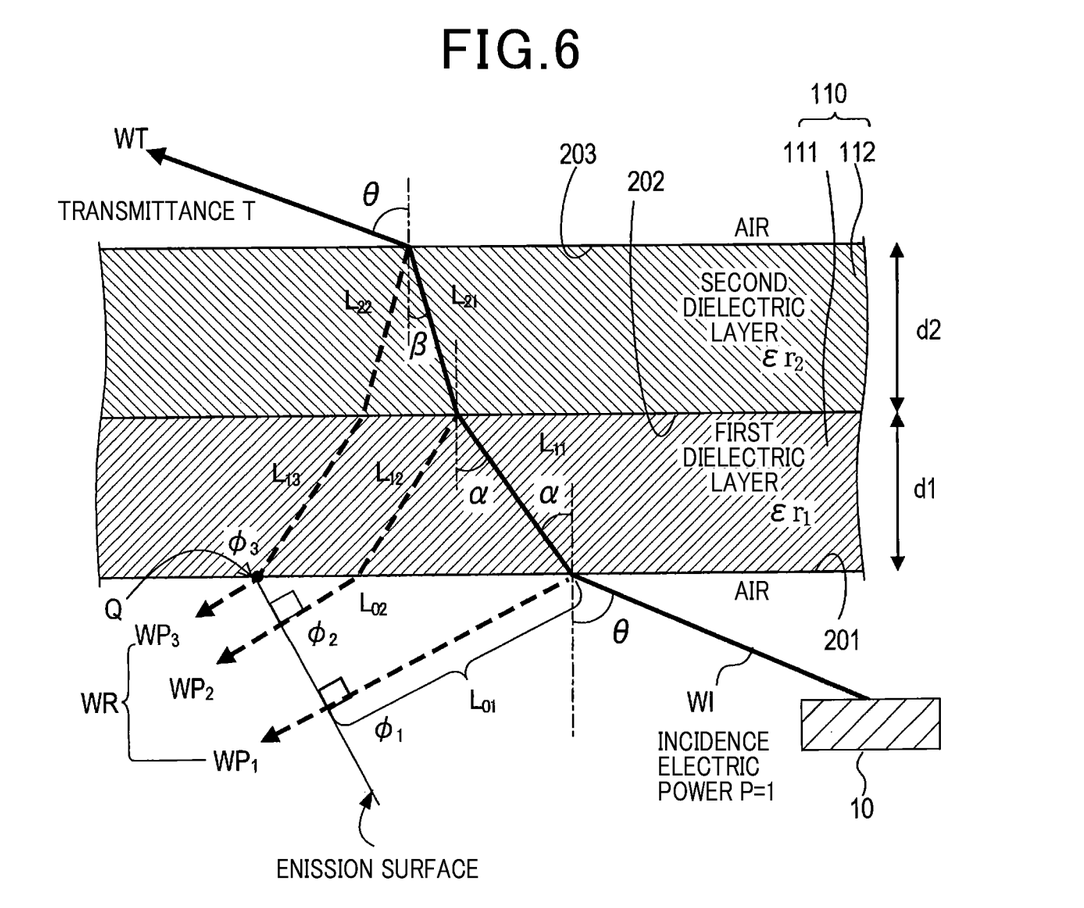
FIG. 6 is an enlarged view of an area A surrounded by a broken line in FIG. 2.

In the radar apparatus 1 thus configured, as illustrated in FIG. 6, part of a probing wave (hereinafter, an incident wave) WI radiated from the antenna unit 13 becomes a transmitted wave WT radiated to the outside of the vehicle 100 via the bumper 110. The remainder of the incident wave WI is reflected by the bumper 110 and becomes a reflected wave WR toward the apparatus portion 10 side. In this situation, if the electric power of the reflected wave WR is lower, the electric power of the transmitted wave WT becomes higher. In the radar apparatus 1, greater electric power of the transmitted wave WT causes an increase in directivity gain as the radar apparatus 1.

[1-3. Effects]

(1a) As described above, the radar apparatus 1 in the present embodiment is configured to detect a distance to an object in the sensing range representing a range of angles determined in advance by sending and receiving a probing wave as an electromagnetic wave. The antenna unit 13 is configured to send and receive the probing wave. The bumper 110 as a cover unit is arranged at a position through which the probing wave sent and received by the antenna unit 13 passes. The bumper 110 has, in an order from closer to the antenna unit 13, the first dielectric layer 111 formed of a dielectric and the second dielectric layer 112 formed of a dielectric having a dielectric constant different from that of the first dielectric layer 111.

The first dielectric layer 111 is configured to have a thickness not more than that for the maximum external transmittance. The external transmittance indicates a transmittance of the probing wave, which is emitted in the direction of the incidence angle to the first dielectric layer 111, which is equal to the maximum sensing angle θk, when the probing wave is transmitted through the bumper 110. The maximum sensing angle θk represents a maximum angle in the sensing range.

Figure 7:
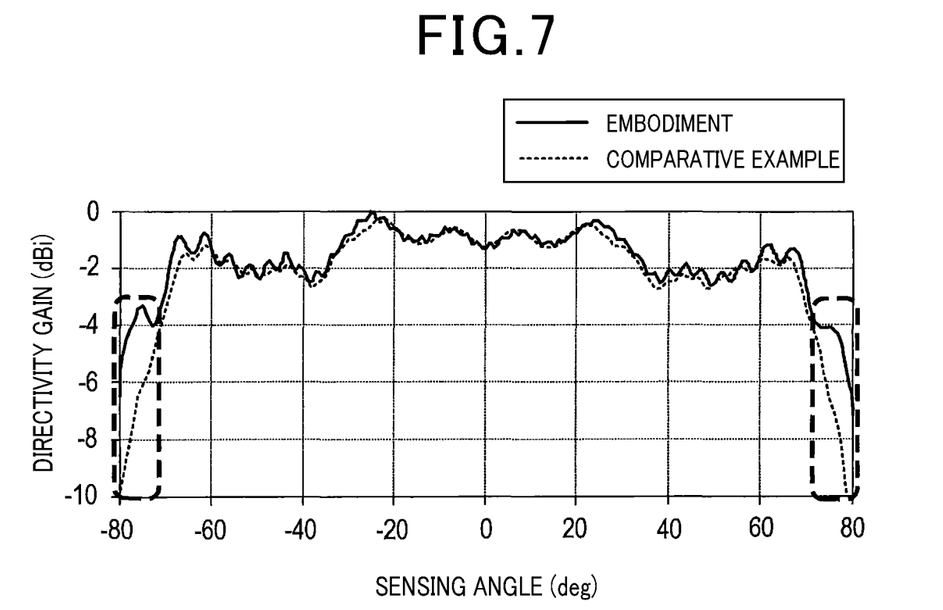
FIG. 7 is a chart representing directivity gain of the radar apparatus in an embodiment and a radar apparatus having a conventional structure.

FIG. 7 illustrates results of, obtained by simulation, characteristics of the radar apparatus 1 indicated as Embodiment in the chart and characteristics of a radar apparatus as a comparative example in which the first dielectric layer 111 is removed from the radar apparatus 1 (hereinafter, a comparative example).

In the radar apparatus 1 in the present embodiment, the directivity gain is more improved particularly near the maximum sensing angle θk than in the comparative example. In the radar apparatus 1 in the present embodiment, it is confirmed that the range allowing accurate object sensing is more enlarged than in the comparative example. Such a radar apparatus 1 is capable of detecting an object at the side more accurately than that of the comparative example when, for example, arranged inside a bumper in the front or rear of the vehicle 100. The side may include right and left relative to the traveling direction of the vehicle 100.

For the simulation, expressions (1) to (10) described below are used.

Specifically, as illustrated in FIG. 6 above, the incident wave WI is transmitted through the first dielectric layer 111, and part thereof is reflected at the surface 201, which is a boundary between the first dielectric layer 111 and the air, and becomes a reflected wave WP1 toward the apparatus portion 10 side.

The probing wave having being transmitted through the first dielectric layer 111 is transmitted through the second dielectric layer 112, and part thereof is reflected at the surface 202 inside the second dielectric layer 112 and is transmitted through the first dielectric layer 111, and becomes a reflected wave WP2 toward the apparatus portion 10 side.

The probing wave having being transmitted through the second dielectric layer 112 is radiated to the outside of the vehicle 100, and part thereof is reflected at a surface 203 representing a boundary between the second dielectric layer 112 and an air layer, that is, a boundary between the bumper 110 and an external air layer and is transmitted through the second dielectric layer 112 and the first dielectric layer 111, and becomes a reflected wave WP3 toward the apparatus portion 10.

When the electric power of the incident wave WI is expressed as 1, the transmitted wave WT is expressed by the expression (1).

[Expression 1]

$$T = 1 - R \quad (1)$$

R in the expression (1) denotes the electric power of the reflected wave WR at an emission surface in FIG. 6 when the electric power of the incident wave WI is expressed as 1. If the electric power of the reflected wave WR is lower, the electric power of the transmitted wave WT becomes higher. The emission surface is a surface including a point Q where the reflected wave WP3, reflected at the surface 203 and having been transmitted through the second dielectric layer 112 and the first dielectric layer 111, exits from the surface 201 and represents a surface perpendicular to the reflected wave WP1 and the reflected wave WP2.

The electric power R of the reflected wave WR at this point is expressed by the formula (2).

[Expression 2]

$$R = \{\sqrt{P_1}\exp(j\varphi_1) + \sqrt{P_2}\exp(j\varphi_2) + \sqrt{P_3}\exp(j\varphi_3)\}^2 \quad (2)$$

The formula (2) expresses a synthetic expression of the reflected waves WP1, WP2, and WP3. P1 denotes electric power of the reflected wave WP1, and φ1 denotes a phase of the reflected wave WP1 at the emission surface. Similarly, P2 denotes electric power of the reflected wave WP2, and φ2 denotes a phase of the reflected wave WP2 at the emission surface. P3 denotes electric power of the reflected wave WP3, and φ3 denotes a phase of the reflected wave WP3 at the emission surface.

The electric power P1 of the reflected wave WP1 in the expression (2) is expressed by the expression (3).

[Expression 3]

$$P_1 = \left\{\frac{\tan(\theta - \alpha)}{\tan(\theta + \alpha)}\right\}^2 \quad (3)$$

The character θ denotes an incidence angle of the incident wave WI to the bumper 110. That is, θ represents the incidence angle of the incident wave WI to the first dielectric layer 111. The character α denotes an angle relative to the normal direction of the first dielectric layer 111 when the incident wave WI having entered the first dielectric layer 111 from the air is refracted at the surface 201. In other words, when the electric power of the incident wave WI is expressed as 1, the electric power of the reflected wave WP1 is expressed by an expression indicating a reflectivity at the surface 201, which is a boundary between the air and the first dielectric layer 111, on the basis of the Fresnel's formula.

The electric power P2 of the reflected wave WP2 in the expression (2) is expressed by the expression (4).

[Expression 4]

$$P_2 = (1 - P_1) \times \left\{\frac{\tan(\beta - \alpha)}{\tan(\beta + \alpha)}\right\}^2 \times (1 - P_1) \quad (4)$$

The character β denotes an angle relative to the normal direction of the second dielectric layer 112 when the incident wave WI having entered the second dielectric layer 112 from the first dielectric layer 111 is refracted at the surface 202. In the present embodiment, the normal direction of the second dielectric layer 112 is equal to the normal direction of the first dielectric layer 111 and the bumper 110.

In other words, the electric power of the reflected wave WP2 is expressed by a product of the transmittance at the surface 201, which is the boundary between the air and the first dielectric layer 111, shown in the first term, the reflectivity at the surface 202, which is the boundary between the first dielectric layer 111 and the second dielectric layer 112, shown in the second term, and the transmittance at the surface 201, which is the boundary between the first dielectric layer 111 and the air layer, shown in the third term.

The electric power P3 of the reflected wave WP3 in the formula (2) is expressed by the formula (5).

[Expression 5]

$$P_3 = (1 - P_1) \times (1 - P_2) \times \left\{ \frac{\tan(\theta - \beta)}{\tan(\theta + \beta)} \right\} \times (1 - P_2) \times (1 - P_1) \quad (5)$$

The electric power of the reflected wave WP3 is expressed by a product of the transmittance at the surface 201, which is the boundary between the air and the first dielectric layer 111, shown in the first term, the transmittance at the surface 202, which is the boundary between the first dielectric layer 111 and the second dielectric layer 112, shown in the second term, the reflectivity at the surface 203, which is the boundary between the second dielectric layer 112 and the air layer, shown in the third term, the transmittance at the surface 202, which is the boundary between the second dielectric layer 112 and the first dielectric layer 111, shown in the fourth term, and the transmittance at the surface 201, which is the boundary between the first dielectric layer 111 and the air layer shown, in the fifth term.

The characters $\alpha$ and $\beta$ in the expressions (3) to (5) are expressed respectively as the expressions (6) and (7) on the basis of known Snell's law.

[Expression 6]

$$\alpha = a\sin\left(\frac{\sin\theta}{\sqrt{\varepsilon_{r1}}}\right) \quad (6)$$

[Expression 7]

$$\beta = a\sin\left(\sqrt{\frac{\varepsilon_{r1}}{\varepsilon_{r2}}} \sin\alpha\right) \quad (7)$$

The signs $\varphi1$, $\varphi2$, and $\varphi3$ in the expressions (2) to (5) are expressed respectively as the expressions (8), (9), and (10). The character c in the formulas (8) to (10) denotes the speed of light. The sign d1 denotes the thickness of the first dielectric layer 111, and the sign $\varepsilon r1$ denotes the relative dielectric constant of the first dielectric layer 111. The sign d2 denotes the thickness of the second dielectric layer 112, and the sign $\varepsilon r2$ denotes the relative dielectric constant of the second dielectric layer 112.

[Expression 8]

$$\phi_1 = \frac{2\pi f}{c} \times \sin\theta \times (2d_1 \times \tan\alpha + 2d_2 \times \tan\beta) \quad (8)$$

The sign $\varphi1$ denotes a phase of the incident wave WI reaching the emission surface by being propagated in a path L01.

[Expression 9]

$$\phi_2 = \frac{2\pi f}{c} \left( \frac{2d_1 \sqrt{\varepsilon_{r1}}}{\cos\alpha} + 2d_2 \times \tan\beta \times \sin\theta \right) \quad (9)$$

The sign $\varphi2$ denotes a phase of the incident wave WI reaching the emission surface by being propagated in paths L11, L12, and L02.

[Expression 10]

$$\phi_3 = \frac{2\pi f}{c} \left( \frac{2d_1 \sqrt{\varepsilon_{r1}}}{\cos\alpha} + \frac{2d_2 \sqrt{\varepsilon_{r2}}}{\cos\beta} \right) \quad (10)$$

The sign $\varphi3$ denotes a phase of the incident wave WI reaching the emission surface by being propagated in paths L11, L21, L22, and L13.

The inventor performed the simulation described above on the basis of these expressions.

Further, the inventor also confirmed, by simulation in the configuration of the present embodiment, change in the linear transmittance and the external transmittance relative to the change in thickness d1 of the first dielectric layer 111 on the basis of the expressions described above. The linear transmittance indicates a transmittance of a probing wave emitted from the apparatus portion 10 in a direction of the incidence angle of 0 with respect to the first dielectric layer 111. As a result of the simulation, the descriptions in (1) and (2) below are confirmed.

Figure 8:
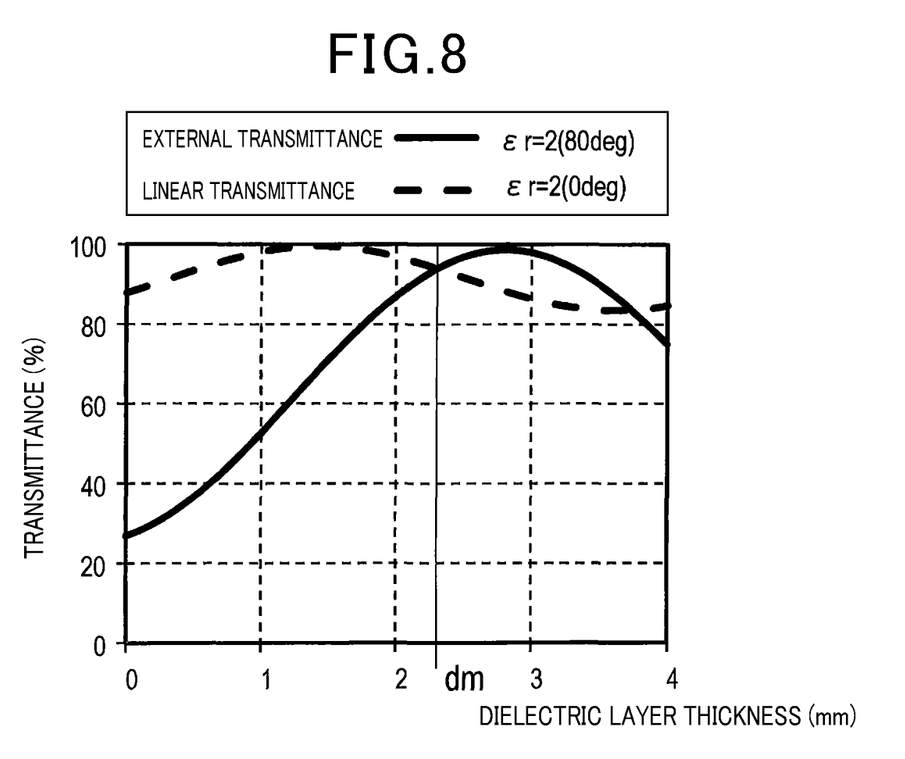
FIG. 8 is a chart representing an external transmittance and a linear transmittance while a thickness of a first dielectric layer is varied in the embodiment.

(1) As illustrated in FIG. 8, it is confirmed that the external transmittance increases more in the case of the bumper 110 being provided with the first dielectric layer 111 than the case of not provided with the first dielectric layer 111. It is also confirmed that the external transmittance exhibits a maximum value when varied to increase the thickness d1 of the first dielectric layer 111. In FIG. 8, the external transmittance exhibits the maximum value when the first dielectric layer 111 has the thickness d1 of approximately 2.8 mm.

(2) It is confirmed that the linear transmittance progresses in the magnitude of approximately 80% or more when varied to increase the thickness d1 of the first dielectric layer 111. It is also confirmed that the linear transmittance exhibits a maximum value when the first dielectric layer 111 has the thickness d1 which is smaller than the thickness when the external transmittance exhibits a maximum value. In FIG. 8, the linear transmittance exhibits the maximum value when the first dielectric layer 111 has the thickness d1 of approximately 1.5 mm, which is smaller than approximately 2.8 mm described above.

Figure 9:
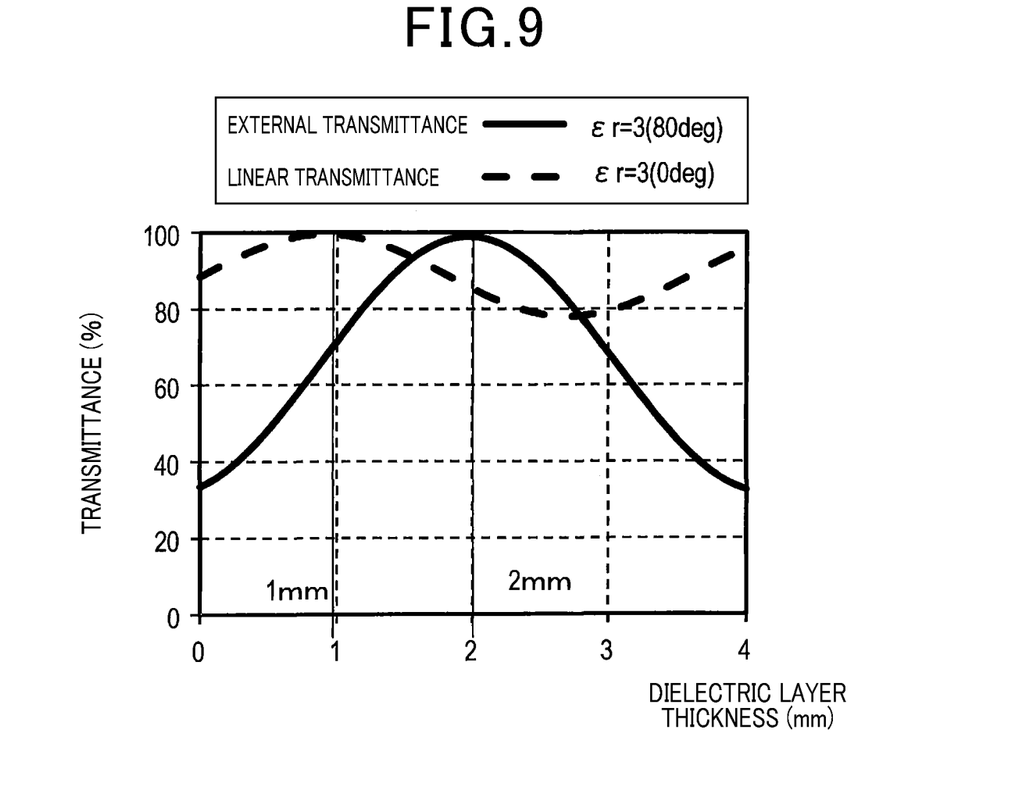
FIG. 9 is a chart representing an external transmittance and a linear transmittance while a thickness is varied in a first dielectric layer having a relative dielectric constant different from that of the above embodiment.

As illustrated in FIG. 9, the (1) and (2) above are similarly confirmed in the case of performing simulation with the dielectric constant $\varepsilon r1$ of the first dielectric layer 111 of 3.0.

In other words, at least the external transmittance increases more in the case of the bumper 110 being provided with the first dielectric layer 111 than the case of the bumper 110 not being provided with the first dielectric layer 111. In particular, the thickness d1 of the first dielectric layer 111 is set to not more than the thickness for the maximum external transmittance, thereby suppressing a decrease in the transmittance of the probing wave applied from the apparatus portion 10 to the entire sensing range when the probing wave is transmitted through the bumper 110.

Accordingly, in the radar apparatus 1 of the present embodiment, the first dielectric layer 111 has the thickness d1 which is not more than the thickness for the maximum external transmittance, thereby allowing suppression of a decrease in sensing performance in the radar apparatus 1 installed inside the bumper 110.

(1b) The first dielectric layer 111 may be configured to have not less than a thickness for a maximum linear transmittance. The linear transmittance indicates a transmittance of a probing wave applied in a direction of the incidence angle of 0 with respect to the first dielectric layer 111 when the probing wave is transmitted through the bumper 110 as the cover unit. As illustrated in FIG. 8, in the configuration of the present embodiment, the thickness d1 of the first dielectric layer 111 for the maximum linear transmittance is approximately 1.5 mm. In other words, the thickness d1 may be set in a range of approximately 1.5 mm or more and approximately 2.8 mm or less.

In this context, "0" is not limited to 0 in a strict sense and does not have to be 0 in a strict sense as long as exhibiting the intended effects.

As a result, the linear transmittance is allowed to be greater while increasing the external transmittance, and the same effects as those in (1a) are provided.

(1c) The radar apparatus 1 may be mounted to the vehicle 100 and have the cover unit configured as the bumper 110 in the vehicle 100. As a result, it is possible to suppress a decrease in sensing performance in the radar apparatus 1 installed inside the bumper 110 without impairing the design as the vehicle 100.

In the above embodiments, the sensing range corresponds to the angular range and the probing wave corresponds to the electromagnetic wave. The bumper 110 corresponds to the cover unit.

[1-4. Modification]

(First Modification) The first dielectric layer 111 may be formed to have the thickness d1 so that the external transmittance is equal to the linear transmittance. Specifically, in the configuration of the present embodiment, the first dielectric layer 111 may be formed so as to have the thickness d1 that is a thickness dm illustrated in FIG. 8. As a result, the same effects as those in (1b) are provided.

Figure 10:
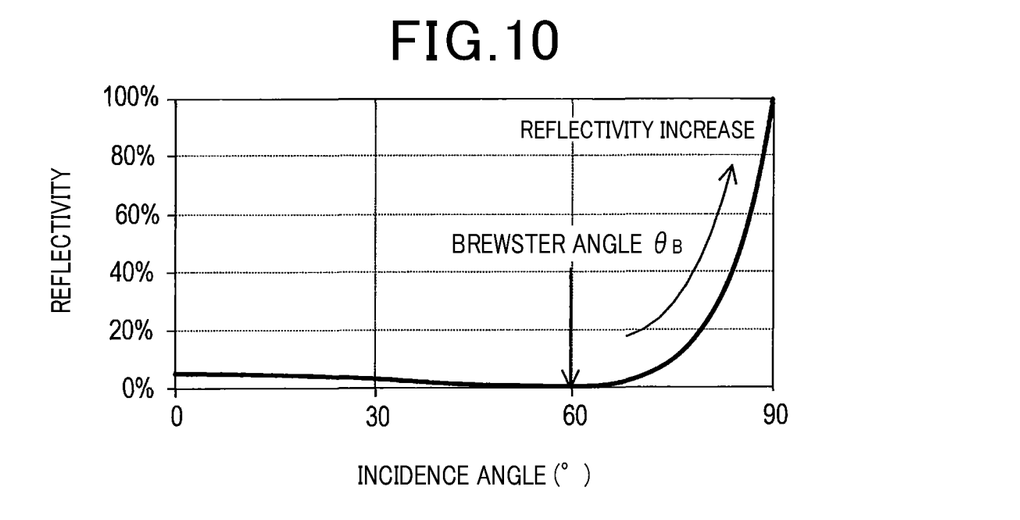
FIG. 10 is a chart illustrating the Brewster angle.

(Second Modification) As illustrated in FIG. 10, it is known from Fresnel's law that the reflectivity representing a ratio of the electromagnetic wave reflected by an object is 0 when the incidence angle of the electromagnetic wave to the object is equal to the so-called Brewster angle. It is also known from Fresnel's law that the reflectivity greatly increases more in the case that the incidence angle of the electromagnetic wave to the object is more than the Brewster angle than the case that the incidence angle is less than the Brewster angle.

Accordingly, when the sensing range is set to be greater than the Brewster angle θB, the first dielectric layer 111 may be configured to be thicker than the thickness for the maximum transmittance of an electromagnetic wave applied in a direction of the incidence angle θ with respect to the first dielectric layer 111, which is equal to the Brewster angle θB, when the electromagnetic wave is transmitted through the bumper 110.

Figure 11:
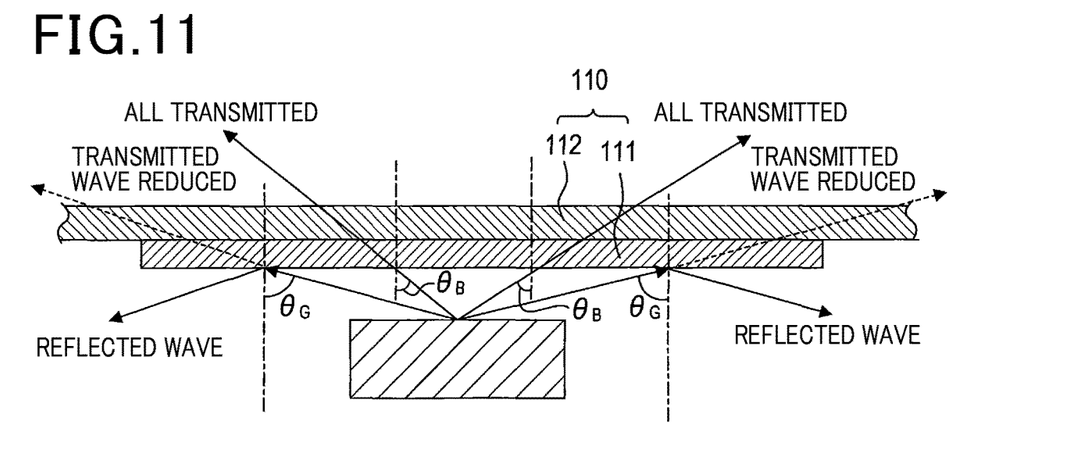
FIG. 11 is a diagram illustrating how a probing wave is transmitted through a bumper in a modification.

As a result, as illustrated in FIG. 11, at least a probing wave applied in a direction of the incidence angle θ, which is equal to the Brewster angle θB, is transmitted through the bumper 110 without being reflected by the bumper 110. A probing wave applied in a direction of the incidence angle θ, which is greater than the Brewster angle θB, has an increased transmittance when being transmitted through the bumper 110 by the first dielectric layer 111 provided in the bumper 110. A decrease in the transmittance of the probing wave when the probing wave is transmitted through the bumper 110 is thus suppressed, the probing wave being applied to the entire sensing range.

In other words, it is possible to suppress a decrease in sensing performance in the radar apparatus 1 due to provision of the bumper 110.

2. Second Embodiment

The second embodiment has the basic configuration same as that of the first embodiment and the configuration in common is omitted from the description to mainly describe the differences. The reference signs that are the same as those in the first embodiment denote an identical configuration and refer to the preceding description.

Figure 12:
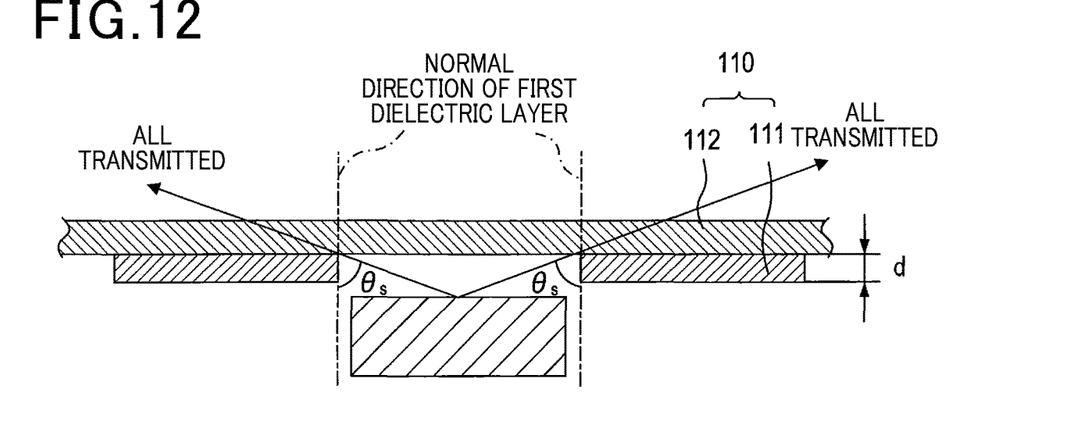
FIG. 12 is a diagram illustrating a configuration of a bumper in a second embodiment.

In the second embodiment, as illustrated in FIG. 12, the first dielectric layer 111 in the bumper 110 may be arranged so as to cover a region in which a probing wave sent from the antenna unit 13 has an application angle to the first dielectric layer 111 of not less than a predetermined installation angle θs. The application angle represents an angle between the direction of the probing wave applied from the antenna unit 13 and the normal direction of the first dielectric layer 111. The installation angle θs may be less than the maximum sensing angle θk.

As a result, a probing wave applied at least in a range except the direction of an application angle of 0 is capable of passing through the first dielectric layer 111.

That is, since the probing wave applied in the direction of an application angle of 0 (hereinafter, a linear probing wave) is capable of being transmitted directly, a decrease in the transmittance of the linear probing wave is suppressed. In addition, in a probing wave applied in a direction of an application angle ranging from the installation angle θs or more to the maximum sensing angle θk or less, a decrease in the transmittance is suppressed by the first dielectric layer 111. That is, it is possible to suppress a decrease in the transmittance of the probing wave applied in the sensing range.

As a result, a decrease in the transmittance of the probing wave is suppressed when the probing wave, which is applied toward the entire sensing range, is transmitted through the bumper 110, and the same effects are provided as the effects (1a) in the first embodiment described above.

(Third Modification) In the bumper 110, the first dielectric layer 111 may be arranged so as to cover a region through which a probing wave is transmitted which is applied in a direction of an application angle ranging from greater than the Brewster angle θB to not greater than the maximum sensing angle θk. In other words, in the second embodiment, the installation angle θs may be set to an angle greater than the Brewster angle θB.

When the application angle is greater than the Brewster angle θB, the reflectivity at the bumper 110, that is, the first dielectric layer 111 rapidly increases by Fresnel's law and the sensing performance significantly decreases on wide angle sides of the radar apparatus 1.

According to the configuration of the present modification, the first dielectric layer 111 is arranged so as to cover the region through which a probing wave is transmitted which is applied in the direction of an application angle ranging from greater than the Brewster angle θB to the maximum sensing angle θk or less. Thus, it is possible to suppress a decrease in the transmittance of the probing wave in this range. As a result, the same effects are provided as the effects (1a) of the first embodiment described above.

3. Third Embodiment

Although the apparatus portion 10 is fixed to the fixing member 130 in the above embodiments, the configuration is not limited to this.

Figure 13:
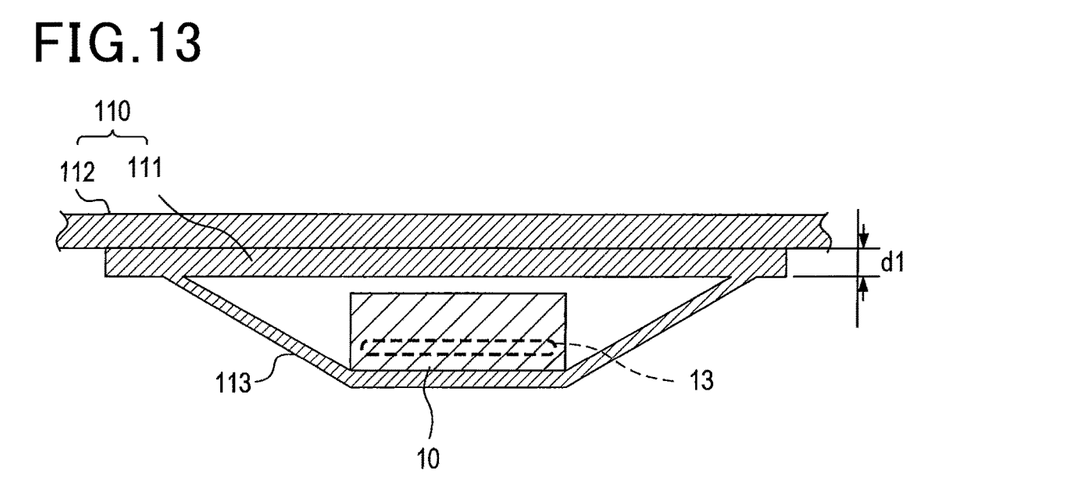
FIG. 13 is a diagram illustrating a configuration of a bumper in a third embodiment.

As illustrated in FIG. 13, the radar apparatus 1 may be provided with a holding portion 113 configured to hold the antenna unit 13 inside the bumper 110. The holding portion 113 may be configured integrally with the first dielectric layer 111.

As a result, a member that holds the antenna unit 13 inside the bumper 110 and the first dielectric layer 111 are allowed to be formed by a common member. Thus, it is possible to reduce the number of components in the vehicle 100.

4. Other Embodiments

Although modes for implementing the present invention have been described above, the present invention is not limited to the above embodiments and may be performed in various modifications.

(4a) Although being set to 24 GHz in the above embodiments, the frequency of the probing wave is not limited to this. The frequency of the probing wave may be set to an arbitrary frequency.

(4b) Although being set at 80 deg in the above embodiments, the sensing range is not limited to this. The sensing range may be set arbitrarily.

(4c) The relative dielectric constant εr1 and the thickness d1 of the first dielectric layer 111 and the relative dielectric constant εr2 and the thickness d2 of the second dielectric layer 112 are not limited to the values set in the above embodiments. The relative dielectric constant of the first dielectric layer 111 and the relative dielectric constant εr2 and the thickness d2 of the second dielectric layer 112 may be set arbitrarily. The thickness d1 of the first dielectric layer 111 in this case may be set as above in accordance with the relative dielectric constant εr1 of the first dielectric layer 111 and the relative dielectric constant εr2 and the thickness d2 of the second dielectric layer 112.

(4d) Although being configured integrally with the first dielectric layer 111 in the above embodiments, the holding portion 113 is not limited to this. The holding portion 113 may be configured separately from the first dielectric layer 111. The holding portion 113 may be formed integrally with the first dielectric layer 111 from a material different from that of the first dielectric layer 111. The holding portion 113 may be formed separately from the first dielectric layer 111 from a material different from that of the first dielectric layer 111.

(4e) A plurality of functions of one element in the above embodiments may be achieved by a plurality of elements, and one function of one element may be achieved by a plurality of elements. A plurality of functions of a plurality of elements may be achieved by one element and one function achieved by a plurality of elements may be achieved by one element. Part of the configuration in the above embodiments may be omitted. At least part of the configuration in the above embodiments may be added to or substituted for the configuration of another embodiment described above. Embodiments of the present invention are all modes included in the spirit specified only by the description in the claims.

The invention claimed is:

1. A radar apparatus configured to detect a distance to an object present in an angular range representing a range of angles determined in advance, by sending and receiving an electromagnetic wave, the radar apparatus comprising:
an antenna unit configured to send and receive the electromagnetic wave; and
a cover unit arranged at a position through which the electromagnetic wave sent and received by the antenna unit passes, wherein
the cover unit has, in an order from closest to the antenna unit, a first dielectric layer formed of a dielectric and a second dielectric layer formed of a dielectric having a dielectric constant different from that of the first dielectric layer,
the first dielectric layer is configured to have a thickness not more than a thickness at which an external transmittance of an electromagnetic wave that is transmitted through the cover unit is at a maximum external transmittance when emitted at an incidence angle equal to a maximum sensing angle of the angular range with respect to the first dielectric layer,
the first dielectric layer is configured to have a thickness not less than a thickness at which a linear transmittance of an electromagnetic wave transmitted through the cover unit is at a maximum linear transmittance when emitted at an incidence angle equal to 0 with respect to the first dielectric layer,
the angular range is set to be greater than a Brewster's angle of the first dielectric layer, and
the first dielectric layer is configured to be thicker than a thickness for a maximum transmittance of an electromagnetic wave, which is emitted in a direction of an incidence angle equal to the Brewster's angle with respect to the first dielectric layer, when the electromagnetic wave is transmitted through the cover unit.

2. The radar apparatus according to claim 1, wherein the first dielectric layer is formed to have a thickness at which the external transmittance is equal to the linear transmittance.

3. The radar apparatus according to claim 1, wherein the radar apparatus is mounted to a vehicle, and the cover unit comprises a bumper of the vehicle.

4. A vehicle comprising:
a radar apparatus configured to detect a distance to an object present in an angular range representing a range of angles determined in advance, by sending and receiving an electromagnetic wave, the radar apparatus comprising an antenna unit configured to send and receive the electromagnetic wave; and
a bumper of the vehicle arranged at a position through which the electromagnetic wave sent and received by the antenna unit passes, the bumper comprising, in an order from closest to the antenna unit, a first dielectric layer and a second dielectric layer having a dielectric constant that is different from that of the first dielectric layer,
wherein
the first dielectric layer is configured to have a thickness not more than a thickness at which an external transmittance of an electromagnetic wave that is transmitted through the bumper is at a maximum external transmittance when the electromagnetic wave is emitted at an incidence angle equal to a maximum sensing angle of the angular range with respect to the first dielectric layer,
the first dielectric layer is configured to have a thickness not less than a thickness at which a linear transmittance of an electromagnetic wave transmitted through the bumper is at a maximum linear transmittance when emitted at an incidence angle equal to 0 with respect to the first dielectric layer,
the angular range is set to be greater than a Brewster's angle of the first dielectric layer, and the first dielectric layer is configured to be thicker than a thickness for a maximum transmittance of an electromagnetic wave, which is emitted in a direction of an incidence angle equal to the Brewster's angle with respect to the first dielectric layer, when the electromagnetic wave is transmitted through the bumper.

5. The vehicle according to claim 4, wherein the first dielectric layer is formed to have a thickness at which the external transmittance is equal to the linear transmittance.

6. A radar cover for an antenna unit configured to send and receive an electromagnetic wave to detect a distance to an object present in an angular range representing a range of angles determined in advance, by sending and receiving an electromagnetic wave through the radar cover, the radar cover comprising:
   a first dielectric layer formed of a dielectric; and
   a second dielectric layer formed of a dielectric having a dielectric constant different from that of the first dielectric layer, wherein
   the first dielectric layer is configured to have a thickness not more than a thickness at which an external transmittance of an electromagnetic wave that is transmitted through the radar cover is at a maximum external transmittance when emitted at an incidence angle equal to a maximum sensing angle of the angular range with respect to the first dielectric layer,
   the first dielectric layer is configured to have a thickness not less than a thickness at which a linear transmittance of an electromagnetic wave transmitted through the radar cover is at a maximum linear transmittance when emitted at an incidence angle equal to 0 with respect to the first dielectric layer,
   the angular range is set to be greater than a Brewster's angle of the first dielectric layer, and
   the first dielectric layer is configured to be thicker than a thickness for a maximum transmittance of an electromagnetic wave, which is emitted in a direction of an incidence angle equal to the Brewster's angle with respect to the first dielectric layer, when the electromagnetic wave is transmitted through the radar cover.

7. The radar cover according to claim 6, wherein the first dielectric layer is formed to have a thickness at which the external transmittance is equal to the linear transmittance.

8. The radar cover according to claim 6, wherein
   the radar cover is mounted to a vehicle, and
   the radar cover comprises a bumper of the vehicle.

* * * * *